(12) United States Patent
Whitelaw (10) Patent No.: US 6,944,876 B1
(45) Date of Patent: Sep. 13, 2005

(54) "V-CHIP" PRESET CRITERIA (75) Inventor: Jeffrey G. Whitelaw, Corona, CA (US)

(73) Assignee: Mitsubishi Digital Electronics America, Inc., Irvine, CA (US)

(*) Notice: Subject to any disclaimer, the term of this patent is extended or adjusted under 35 U.S.C. 154(b) by 0 days.

(21) Appl. No.: 09/408,112

(22) Filed: Sep. 29, 1999

(51) Int. Cl.[7] .......................... H04N 7/16; H04N 7/167; H04N 5/445; G06F 3/00; G06F 13/00

(52) U.S. Cl. .................. 725/25; 725/27; 725/28; 725/30; 725/31; 725/44; 725/45; 725/46; 725/47; 725/55

(58) Field of Search .......................... 725/25, 27, 28, 725/30, 31, 44–47, 55; 348/734

(56) References Cited

U.S. PATENT DOCUMENTS

| | | | | |
|---|---|---|---|---|
| 5,684,918 A | * | 11/1997 | Abecassis | 386/83 |
| 5,828,402 A | * | 10/1998 | Collings | 348/460 |
| 5,995,133 A | * | 11/1999 | Kim | 340/5.28 |
| 6,037,969 A | * | 3/2000 | Lim et al. | 380/221 |
| 6,216,263 B1 | * | 4/2001 | Elam | 725/151 |
| 6,505,348 B1 | * | 1/2003 | Knowles et al. | 725/28 |
| 6,662,365 B1 | * | 12/2003 | Sullivan et al. | 725/25 |

FOREIGN PATENT DOCUMENTS

WO  WO 99/44361  9/1999

* cited by examiner

Primary Examiner—John Miller
Assistant Examiner—Michael W. Hoye
(74) Attorney, Agent, or Firm—Orrick, Herrington & Sutcliffe LLP (57) ABSTRACT

Systems, methods and apparatus are provided for allowing a user to supervise personal exposure to a program exhibited by a consumer electronics device, such as a television system. The consumer electronics device includes "V-chip" circuitry that analyzes a signal and either blocks or passes the signal based on certain content-based criteria. In this connection, a user can program the "V-chip" circuitry with the preset content-based criteria in the form of preset content-based specification sets, which are stored in the consumer electronics device by the manufacturer. The preset content-based specification sets specify either allowable or objectionable content within a program signal received by the consumer electronics device. The "V-chip" circuitry receives a content-based indicator set, which is indicative of the actual content of the program signal. One of the preset content-based specification sets is conveniently selected by a user. The "V-chip" circuitry then compares the content-based indicator set with the selected preset content-based specification set when the program signal is received by the consumer electronics device. Based on this comparison, the "V-chip" circuitry either passes the signal to an output device for transformation of the signal into the program, or blocks the signal from being sent to the output device.

46 Claims, 7 Drawing Sheets

"V-CHIP" PRESET CRITERIA

RELATED APPLICATIONS

This application is related to copending application Ser. No. 09/295,935, filed Apr. 21, 1999, and which is hereby fully and expressly incorporated herein by reference.

FIELD OF THE INVENTION

This invention relates to the field of consumer electronics devices and, more particularly, to methods and systems for limiting personal exposure to a television system or other consumer electronics device.

BACKGROUND

There has been long-standing concern on the part of parents or guardians as to the content of programs watched by children and minors. This concern has been long-standing with respect to televisions and, more recently, with respect to on-line services such as, those provided through service providers, e.g., America Online, or through other electronic means of text and image-based communication.

Various attempts have been made to limit access by children to subject matter that is deemed inappropriate. Certain locks simply block specific channels, where those channels are either known to or are suspected to carry programming which is deemed unacceptable for viewing by children. Other systems incorporate time-based limitations, for example, where the entire television may not be used during certain hours. Typically, the set time limits would preclude operation of the system during "bedtime" hours or at times when parental supervision does not exist, e.g., after school hours. Yet other lock systems serve to make the entirety of the system unavailable other than to authorized users.

Various attempts have been made to provide more refined lock systems. One attempt, the so-called "V-chip" system, utilizes a coding system indicative of content. For example, a given show may be designated as including adult language, violence or nudity. These indicators are often provided by single letter designators, such as L, V and N, respectively. Other coding systems analogous to movie rating codes, such as G for general audience, PG for parental guidance, R for restricted, etc., may also serve as a censor-based assessment of the content. These content-based designators are carried in television systems over the extended data service (XDS or EDS) system. The adopted standard for NTSC television is the EIA-608 standard. Information which is typically carried in such systems includes the network name, show title, and brief description of the contents of the show. There are currently proposals to include rating information of the type previously mentioned in the XDS data.

Figure 1:
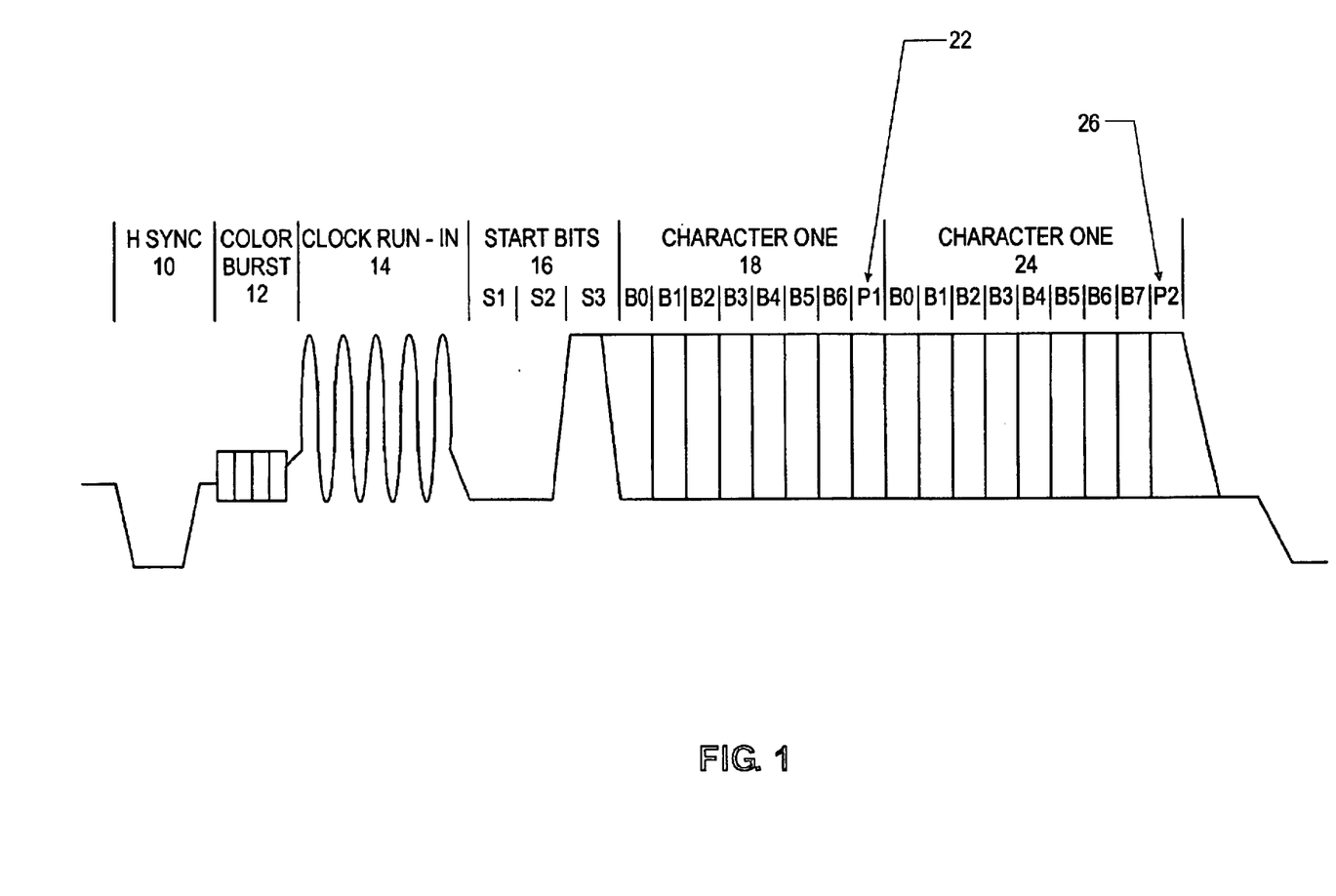
FIG. 1 shows the prior art EIA-608 standards, depicting a typical signal as a function of time.

FIG. 1 shows a typical format of EIA-608 standards as a function of time. Initially, a horizontal sync pulse 10 initiates a pulse train. A color burst pulse 12 follows the horizontal sync pulse, and is typically provided for all line scans. Next, a clock run-in-signal 14 serves as a synchronizing signal. A sequence of start bits 16, labeled S1, S2 and S3 follow. As depicted, the pulse train here is shown with pulse S3 being "high" and S1 and S2 being "low." In the extended data service system, various characters are then provided. Character one 18 is composed of bits (labeled B0, B1, B2, B3, B4, B5 and B6) and a parity check bit 22 (labeled P1). Character two 24 is composed of bits (labeled B0, B1, B2, B3, B4, B5, B6 and B7) and a parity check bit 26 (labeled P2) for the byte of character two 24. Typically, the XDS data is carried on a line, which is not visible on the television display, such as line 21.

Figure 2:
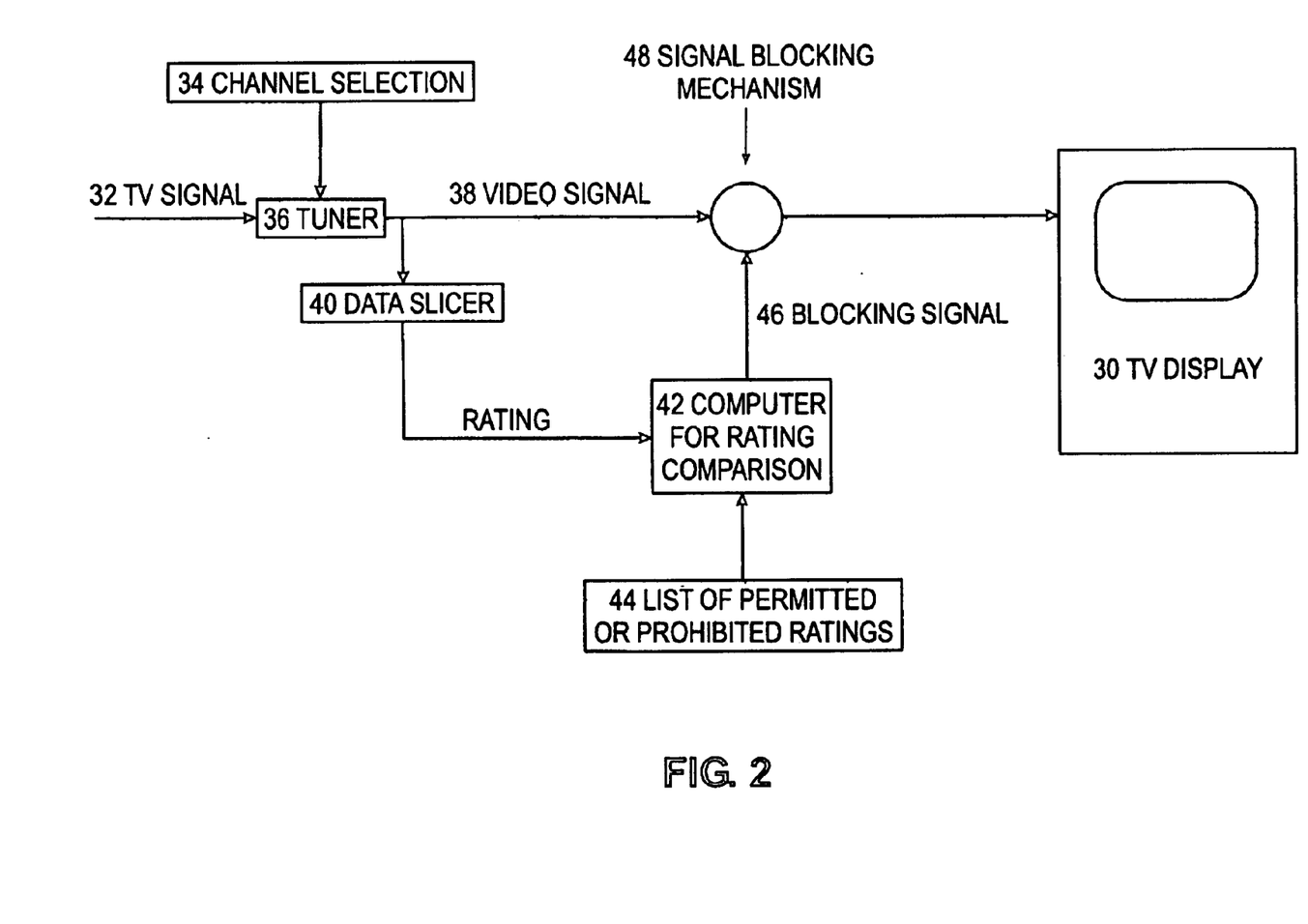
FIG. 2 is a schematic drawing of the prior art "V-chip" system.

FIG. 2 shows a schematic drawing of the prior art "V-chip" system. A television or other display 30 is the ultimate recipient of display information. Initially, some source of information such as a television signal 32 is supplied from any number of sources, such as over-the-air transmission, cable or other recorded source. Channel selection 34 controls the tuner 36 to select the desired information from television signal 32. The output of tuner 36 is an audio/video signal 38 corresponding to the channel selected. A data slicer 40 is coupled to the output of the tuner 36. The data slicer 40 functions to monitor the XDS signal as carried in the audio/video signal 38. The data slicer 40 may either strip the XDS signal from the audio/video signal 38 or simply duplicate the XDS signal. With the "V-chip" system, the XDS data obtained by the data slicer 40 is program rating information. The program rating information is supplied from the data slicer 40 to the comparator 42. A list 44 of prohibited ratings is stored or provided. Typically, the system would identify all prohibited ratings by level, such as R and X, though a system could utilize logic to prohibit any rating at a given level or above (the convention above meaning more mature or more likely to be prohibited). In the event of coincidence between the output of the data slicer 40 comprising the rating data of the program and the list of prohibited ratings 44, the comparator 42 provides a blocking signal 46 to signal blocking mechanism 48. The signal blocking mechanism 48 functions as a switch, blocking or otherwise scrambling audio/video signal 38, such that the show having the prohibited rating is not displayed.

A problem with the current "V-Chip" systems is that these systems are apparently not as user-friendly as the FCC had hoped. For example, the user must typically select, not only a television rating and/or movie rating, but also one or more subject matter categories (e.g., L, V, N), requiring that the user negotiate several menus within the menu system of the television. Adding to the complexity is the FCC requirement that the subject matter categories and ratings are interdependent. That is, only certain subject matter categories are selectable given a selected television or moving rating. Thus, a simpler implementation of a V-Chip system is desired.

SUMMARY OF THE INVENTION

This present invention comprises novel methods, apparatuses and systems for supervising personal exposure to a consumer electronics device, such as a television system, by reviewing programs for a selected content threshold in accordance with preset criteria.

In accordance with a first aspect of the invention, a method for supervising personal exposure to a consumer electronics device is provided. In the method, one or more preset content-based specification sets are permanently stored in the consumer electronic device, such as a television system. The preset content-based specification sets are preferably stored in the consumer electronics device by the manufacturer. Each of the preset content-based specification sets specifies either the allowable or objectionable content of user discernible information output by the consumer electronics device, and includes a rating, such as a television rating and/or movie rating, and a subject matter category, such as violence, sexual situations, and so on. One of the one or more content-based specification sets can then be selected by a user (preferably, a parent) to limit exposure to the user discernible information output by the consumer electronics device. In the case of a television system, the user discernible information may represent itself as a picture and sound. By way of nonlimiting example, selection of the one or more content-based specification sets can be accomplished through a menu system or a dedicated function key. Although, in the preferred method, the user may customize a content-based specification set, the provision of preset content-based specification sets, from which the user can select, allows the user a simpler option to limit the exposure to the user discernible information. To make the process even more simple, only a single preset content-based specification set can be stored in the consumer electronics device.

When the consumer electronics device is used, a signal, such as a television program signal, is received, which, without intervention, would be transformed into user discernible information for exhibition to a user. A content-based indicator set, which is indicative of the actual content of the user discernible information, is also received. Like the preset content-based indicator set, the content-based indicator set includes a rating, such as a television rating and/or movie rating, and a subject matter category, such as violence, sexual situations, and so on. The content-based indicator set can be carried by the program signal itself, or it can originate from some other source. The received content-based indicator set is then compared to the selected preset content-based specification set. Based on this comparison, the program signal is impaired by, for example, blocking or scrambling the program signal. In the case of a television system, one or more of the video, audio, or closed-captioning aspects of the program signal can be impaired.

In the preferred method, the program signal is impaired if the received content-based indicator set transgresses the selected content-based specification set. If the content-based specification set represents objectionable content, transgression of the selected content-based specification set occurs if the rating of the received content-based indicator set is equal to or greater than a rating defined in the selected content-based specification set, or if any subject matter category of the received content-based indicator set coincides with a subject matter category defined in the selected content-based specification set. If the content-based specification set represents allowable content, transgression of the selected content-based specification set occurs if the rating of the received content-based indicator set is greater than a rating defined in the selected content-based specification set, or if any subject matter category of the received content-based indicator set does not coincide with a subject matter category defined in the selected content-based specification set.

In accordance with another aspect of the present invention, a permanent recordable medium for use in a consumer electronics device, such as a television system, is provided. The recordable medium stores one or more of the preset content-based specification sets. Preferably, the one or more preset content-based specification sets are stored in the recordable medium when the consumer electronics device is manufactured. The permanent recordable medium further includes computer software that selects one of the one or more preset content-based specification sets upon command by a user of the consumer electronics device. The computer program then compares the selected preset content-based specification set with a content-based indicator set received by the consumer electronics device, and generates a control signal in response to the comparison. In the preferred embodiment, if the content-based indicator set transgresses the selected preset content-based specification set, the control signal is a blocking control signal that effects impairment of a signal received by the consumer electronics device. By way of nonlimiting example, the permanent recordable medium can take the form of a chip, such as a ROM chip, or alternatively, several chips.

In accordance with still another aspect of the present invention, a consumer electronics device having "V-chip" circuitry for supervising personal exposure to user discernible information, is provided. The consumer electronics device can be, for example, a television system, a video cassette recorder (VCR), a stereo, or computer. The consumer electronics device includes a permanent nonvolatile memory, such as ROM, for storing one or more of the preset content-based specification sets. The consumer electronics device further includes a logic unit coupled to the nonvolatile memory. The logic unit is configured for selecting one of the one or more preset content-based specification sets upon command by a user of the consumer electronics device. The logic unit then compares the selected preset content-based specification set with a content-based indicator set received by the consumer electronics device, and generates a control signal in response to the comparison. The consumer electronics device also includes a signal impairment mechanism coupled to the logic unit. By way of nonlimiting example, the signal impairment mechanism can be a switch or a scrambler. The signal impairment mechanism is configured for selectively impairing a signal, or passing the signal without substantial impairment, based on the control signal. In the preferred embodiment, if the content-based indicator set transgresses the selected preset content-based specification set, the control signal is a blocking control signal that effects impairment of a signal received by the consumer electronics device.

Other and further objects, features, aspects, and advantages of the present invention will become better understood with the following detailed description of the accompanying drawings.

BRIEF DESCRIPTION OF THE DRAWINGS

The drawings illustrate both the design and utility of preferred embodiments of the present invention, in which.

DETAILED DESCRIPTION OF THE PREFERRED EMBODIMENTS

Figure 3:
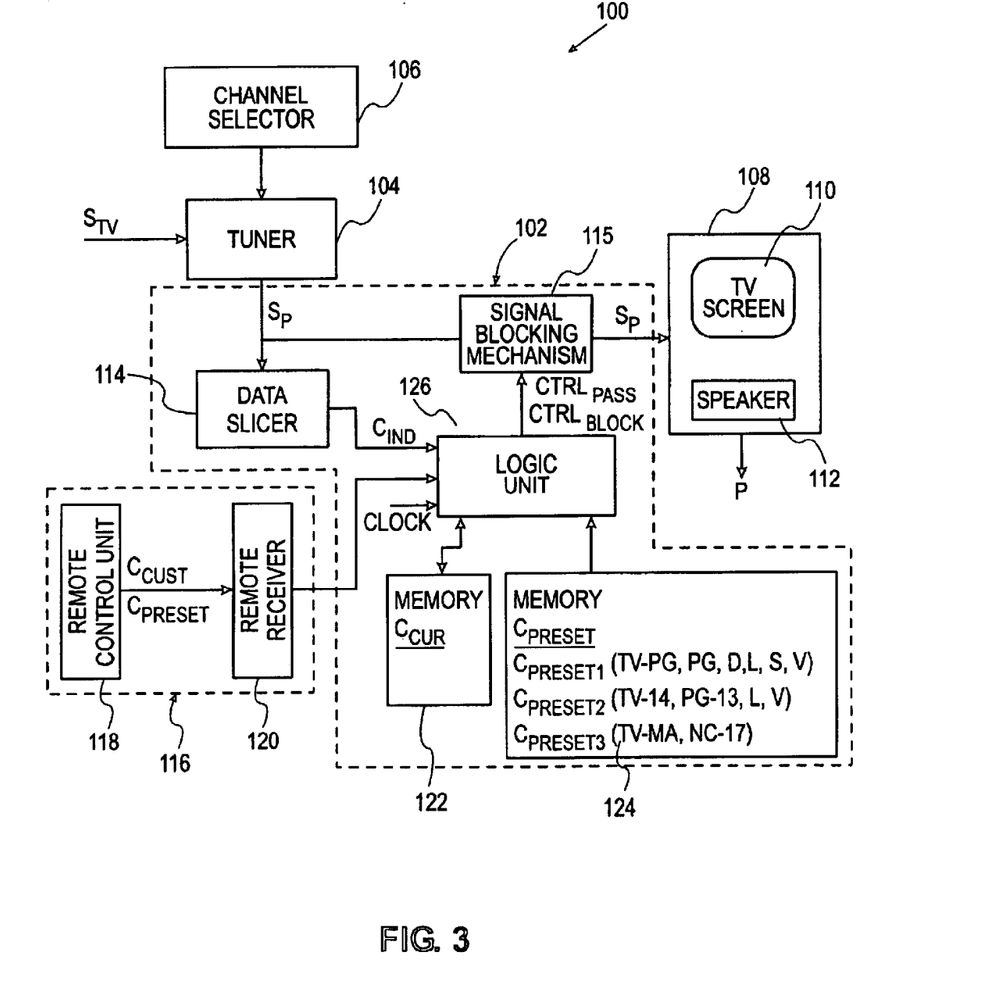
FIG. 3 is a schematic drawing of a preferred embodiment of a "V-chip" system constructed in accordance with the present invention.

FIG. 3 shows a schematic representation of a consumer electronics system 100, and particularly a television system, constructed in accordance with another preferred embodiment of the invention. It should be noted that the consumer electronics system 100 is not to be limited to a television system, but can include any type of system that receives information that a parent might find objectionable, such as a video cassette recorder (VCR), audio equipment and computer equipment. In general, the television system 100 receives a television program signal $S_{TV}$, and, absent intervention, provides a program P to a viewer in the form of audio/visual information. The television system 100 includes "V-chip" circuitry 102, which can be programmed by a user, such as a parent, to selectively limit exposure of any programs P to children that the user feels contain inappropriate subject matter. In particular, the "V-chip" circuitry 102 can be programmed to block the program P if the content of the program P meets certain criteria selected by the user.

In this connection, the television system 100 includes a tuner 104, which receives the television signal $S_{TV}$ and, under the control of a channel selector 106, provides a program signal $S_p$, at an output. Typically, the television signal $S_{TV}$, includes a broad range of program channels when received via an antenna or directly from cable entering the premises. It is often the case, however, that the television signal $S_{TV}$, received by the tuner 104 has been pre-tuned, for example, through a cable box or video cassette recorder (VCR) (both not shown). In this case, the television signal $S_{TV}$ received by the television system 100 includes a single program channel. The television system 100 further includes an audio/visual output device (or main television unit) 108, which transforms the program signal $S_p$ into the program P in the form of a display on a television screen 110 and sound from a speaker 112.

The "V-chip" circuitry 102 of the television system 100 includes a signal blocking mechanism 115, which is coupled to the output of the tuner 104 to receive the program signal $S_p$. The signal blocking mechanism 115 is shown as a simple switch, but can be any mechanism that allows a signal to be selectively passed and blocked. Depending on the state of a control signal received by the signal blocking mechanism 115, the program signal $S_p$ is either blocked from passing or allowed to pass to the main television unit 108. In alternative embodiments, the "V-chip" circuitry 102 includes a signal scrambler, which either scrambles the program signal $S_p$ or passes the program signal $S_p$ to the main television unit 108 without impairment thereof.

In this particular embodiment, the program signal $S_p$ not only includes information required to provide the program P to the viewer, but also a content-based indicator set $C_{IND}$ indicative of the content of the program P. The content-based indicator set $C_{IND}$ includes one or more ratings, such as a television and/or movie rating, and one or more subject matter categories, such as sex or violence. Presently, the Federal Communications Commission (FCC) dictates the following ratings and subject matter categories: television ratings shall include TV-Y, TV-Y7, TV-G, TV-PG, TV-14 and TV-MA; movie ratings shall include G, PG, PG-13, R, NC-17 and X; and the subject matter categories include FV (Fantasy Violence), D (Sexual Dialog), L (Adult Language), S (Sexual Situations) and V (Violence). It can be appreciated by those skilled in the art that the present invention is not limited to the above-disclosed ratings and categories, but can encompass any combination of a rating and subject matter category that provides information allowing an individual to determine the content of a particular program P received by the television system 100.

It should be noted that the television ratings and subject matter categories are interrelated. As currently dictated by the FCC, certain subject matter categories can be selected only if certain television ratings have been selected. For instance, category FV can only be selected if TV-Y7 has been selected. Category D can only be selected if TV-PG or TV-14 has been selected. Categories L, S and V can only be selected if TV-PG, TV-14 or TV-MA has been selected. Thus, the selection of categories enhances the television rating selected by the user. For instance, if television rating TV-14 and category S are selectively allowed, then all programs P rated TV-MA are blocked and all programs P containing sexual situations are blocked. Thus, the discretionary aspect of a selected television rating can be supplemented by further selecting a subject matter category. In this case, the following rating-category combinations can be created: TV-Y7 FV, TV-PG D, TV-PG L, TV-PG S, TV-PG V, TV-14 D, TV-14 L, TV-14 S, TV-14 V, TV-MA L, TV-MA S and TV-MA V.

The content-based indicator set $C_{IND}$ is incorporated into the program signal $S_p$, preferably using an extended data service (XDS or EDS) system. It can be appreciated by those skilled in the art that the content-based indicator set $C_{IND}$ can originate from any source dependent or independent from the program signal $S_p$. For instance, the content-based indicator set $C_{IND}$ can be supplied by the Program Status Information Protocol (PSIP) or an Electronic Program Guide (EPG). The "V-chip" circuitry 102 further includes a data extraction device 114, which is coupled to output of the tuner 104 to receive the program signal $S_p$. In this embodiment, the data extraction device 114 is a closed-caption data slicer, which monitors the program signal $S_p$, and obtains from it XDS information, namely, the content-based indicator set $C_{IND}$.

A user entry system 116, which includes a remote control unit 118 and a corresponding remote receiver 120, is the mechanism by which a user specifies a current content-based specification set $C_{CUR}$ to be used by the "V-Chip" circuitry 102. As will be described in further detail below, the user can either specify the current content-based specification set $C_{CUR}$ by defining a custom content-based specification set $C_{CUR}$ or selecting from one or more preset content-based specification sets $C_{CUR}$ stored in permanent nonvolatile memory 124, such as a ROM.

The current content-based specification set $C_{CUR}$ is indicative of the content of any program P that the user wishes to limit, and resides in nonvolatile memory 122, such as Flash Memory or EEPROM. Like the content-based indicator set $C_{IND}$, the current content-based specification set $C_{CUR}$ includes one or more ratings (typically a maximum of two-television and movie) and one or more subject matter categories. In the preferred embodiment, a rating of the current content-based specification set $C_{CUR}$ represents the lowest objectionable rating of the program signal $S_p$, such that a program signal $S_p$ having a rating lower than the rating of the current content-based specification set $C_{CUR}$ will be allowed to pass to the main television unit 108, while a program signal $S_p$ having a rating equal to or greater than the rating of the current content-based specification set $C_{CUR}$ will be prevented from passing to the main television unit 108. The subject matter categories of the current content-based specification set $C_{CUR}$ represent objectionable subject matter contained in the program signal $S_p$, such that a program signal $S_p$ having subject matter, none of which coincides with the subject matter categories of the current content-based specification set $C_{CUR}$, will be allowed to pass to the main television unit 108, while a program signal $S_p$ having subject matter, any of which coincides with the subject matter categories of the current content-based specification set $C_{CUR}$, will be prevented from passing to the main television unit 108.

Alternatively, a rating of the current content-based specification set $C_{CUR}$ can represent the highest allowable rating of the program signal $S_p$, and the subject matter categories of the current content-based specification set $C_{CUR}$ can represent allowable subject matter contained in the program signal $S_p$. For example, a program signal $S_p$ having a rating equal to or less than the rating of the current content-based specification set $C_{CUR}$ will be allowed to pass to the main television unit 108, while a program signal $S_p$ having a rating greater than the rating of the current content-based specification set $C_{CUR}$ will be prevented from passing to the main television unit 108. A program signal $S_p$ having subject matter, any of which does not coincide with the subject matter categories of the current content-based specification set $C_{CUR}$, will be prevented from passing to the main television unit 108, while a program signal $S_p$ having subject matter, all of which coincides with the subject matter categories of the current content-based specification set $C_{CUR}$, will be allowed to pass to the main television unit 108.

The "V-chip" circuitry 102 further includes a logic unit 126 to generate either a block control signal $CTRL_{BLOCK}$, which causes the signal blocking mechanism 115 to preclude the program signal $S_p$ from being passed effectively to the main television unit 108 (whether the signal be totally blocked, scrambled or otherwise significantly impaired), or a pass control signal $CTRL_{PASS}$, which permits the program signal $S_p$ to be passed via the signal blocking mechanism 115 to the main television unit 108. In the preferred embodiment, the logic unit 126 is preferably implemented as a microprocessor. While an integrated device is preferable, any analog or digital system, discrete or integrated, or combinations thereof may be utilized if the functionalities of the invention may be achieved.

The logic unit 126 is coupled to the output of the data slicer 114 and the nonvolatile memory 122 to respectively receive the extracted content-based indicator set $C_{IND}$ and the current content-based specification set $C_{CUR}$. The logic unit 126 compares the content-based indicator set $C_{IND}$ with the current content-based specification set $C_{CUR}$, and generates a control signal CTRL (either $CTRL_{BLOCK}$ or $CTRL_{PASS}$) in response thereto. The logic unit 126 is coupled to a clocking signal CLOCK, which allows the control signal CTRL to be periodically updated, preferably during every frame of the program signal $S_p$ (about every 16 ms). The control signal CTRL can, however, be updated less frequently, e.g., every second or every minute. As will be described in further detail below with reference to FIG. 5, the logic unit 126 is also coupled to the user entry system 116 to allow programming of the current content-based specification set $C_{CUR}$.

Figure 4:
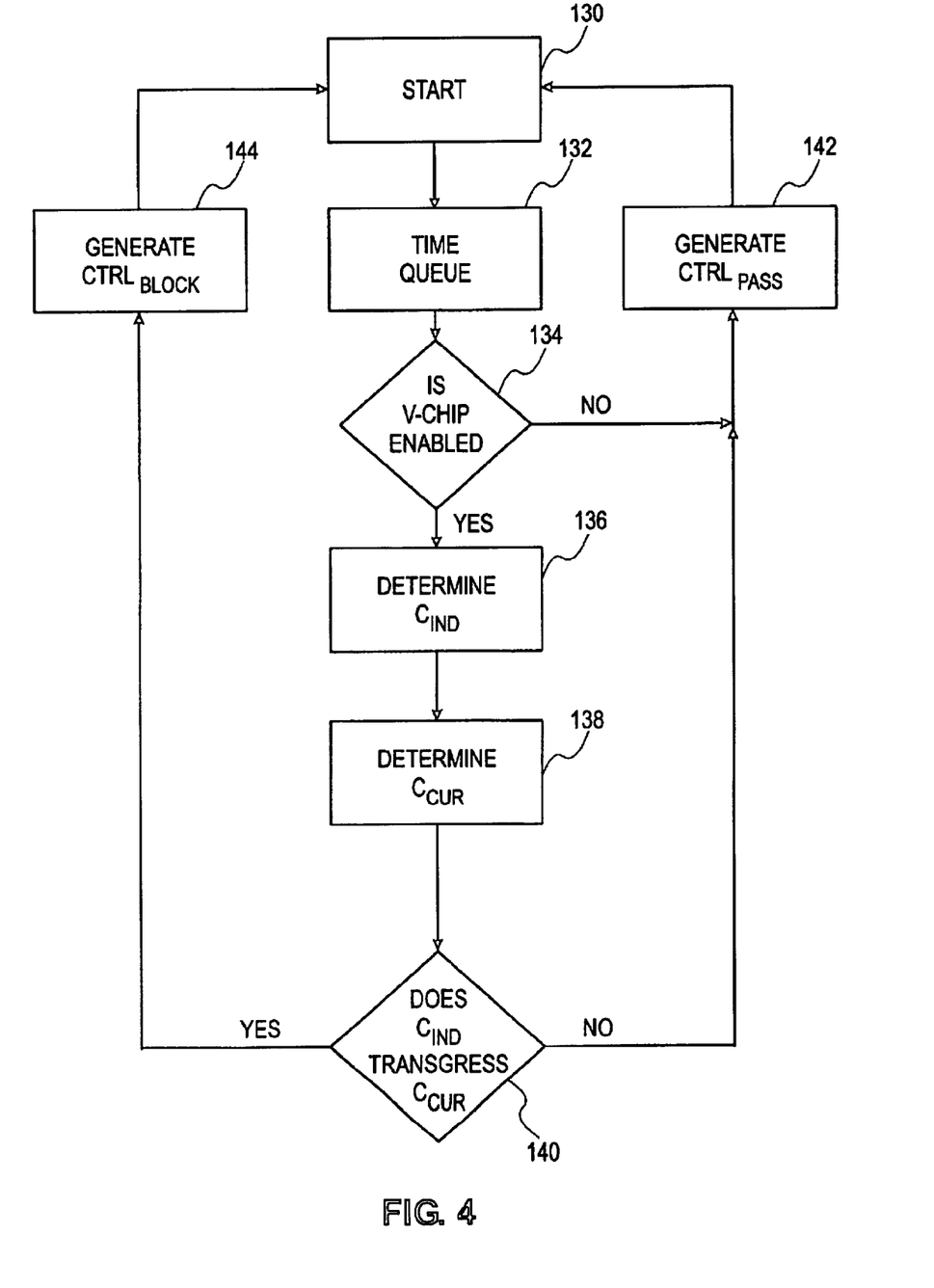
FIG. 4 is a flowchart showing a preferred method of selecting between blocking or passing a program signal performed in the "V-chip" system of FIG. 3.

Referring further to FIG. 4, operation of the logic unit 126 is explained in further detail. At step 130, the control signal CTRL generated by the logic unit 126 represents a block control signal $CTRL_{BLOCK}$ or a pass control signal $CTRL_{PASS}$. When the control signal CTRL represents a block control signal $CTRL_{BLOCK}$, the signal blocking mechanism 115 blocks the program signal $S_p$ from being sent to the main television unit 108. For the purposes of this specification, it should be understood that blocking the program signal $S_p$ entails blocking at least one of the video, audio and captioning aspects of the program signal $S_p$. Preferably, however, all three of these aspects are blocked, such that the picture, sound and captioning will not be output from the main television unit 108. When the control signal CTRL represents a pass control signal $CTRL_{PASS}$, the signal blocking mechanism 115 sends the program signal $S_p$ to the main television unit 108, such that the picture, sound and captioning are output.

At step 132, the logic unit 126 waits for a time queue from the clock signal CLOCK, and upon receipt of the time queue, the logic unit 126 determines, at step 134, whether the "V-chip" circuitry 102 is enabled. As will be described in further detail below, the "V-Chip" circuitry 102 can be alternately enabled, such that the program signal $S_p$ is automatically analyzed, and disabled, such that the program signal $S_p$ is automatically passed to the main television unit 108 without analysis thereof.

If the "V-Chip" circuitry 102 is found to be disabled, the logic unit 126, at step 142, generates a pass control signal $CTRL_{PASS}$, thereby passing the program signal $S_p$ to the main television unit 108. If, on the other hand, the "V-chip" circuitry 102 is found to be enabled, the logic unit 126 determines, at steps 136 and 138, the content-based indicator set $C_{IND}$ obtained from the data slicer 114 and the current content-based specification set $C_{CUR}$ obtained from the nonvolatile memory 122. At step 140, the content-based indicator set $C_{IND}$ is compared with the current content-based specification set $C_{CUR}$. If the content-based indicator set $C_{IND}$ transgresses the current content-based specification set $C_{CUR}$, the logic unit 126, at step 144, generates a block control signal $CTRL_{BLOCK}$, thereby blocking the program signal $S_p$ from being sent to the main television unit 108. If, on the other hand, the content-based indicator set $C_{IND}$ does not transgress the current content-based specification set $C_{CUR}$, the logic unit 126, at step 142, generates a pass control signal $CTRL_{PASS}$, thereby passing the program signal $S_p$ to the main television unit 108.

For the purposes of this specification, a content-based indicator set $C_{IND}$ transgresses a current content-based specification set $C_{CUR}$ if either the rating (television and/or movie) of the content-based indicator set $C_{IND}$ is equal to or greater than the rating (television and/or movie) of the current content-based specification set $C_{CUR}$, or a subject matter category of the content-based indicator set $C_{IND}$ coincides with any subject matter category of the current content-based specification set $C_{CUR}$. It should be noted that this is the case when the rating and subject matter categories of the current content-based specification set $C_{CUR}$ respectively represent the lowest objectionable rating of the program signal $S_p$ and objectionable subject matter contained in the program signal $S_p$ as discussed above. On the other hand, if the rating and subject matter categories of the current content-based specification set $C_{CUR}$ represent the highest allowable rating of the program signal $S_p$ and allowable subject matter contained in the program signal $S_p$, then a content-based indicator set $C_{IND}$ transgresses a current content-based specification set $C_{CUR}$ if either the rating of the content-based indicator set $C_{IND}$ is greater than the rating of the current content-based specification set $C_{CUR}$, or a subject matter category of the content-based indicator set $C_{IND}$ does not coincide with one of the subject matter categories of the current content-based specification set $C_{CUR}$.

After the control signal CTRL is generated, the logic unit 126 proceeds to step 130, where the analysis process is repeated. It should be noted that the logic unit 126 performs the aforementioned steps by executing instructions that preferably take the form of computer software-stored in the memory 124 or other suitable storage medium, such as a ROM chip, or fixed logic, such as an ASIC.

Figure 5:
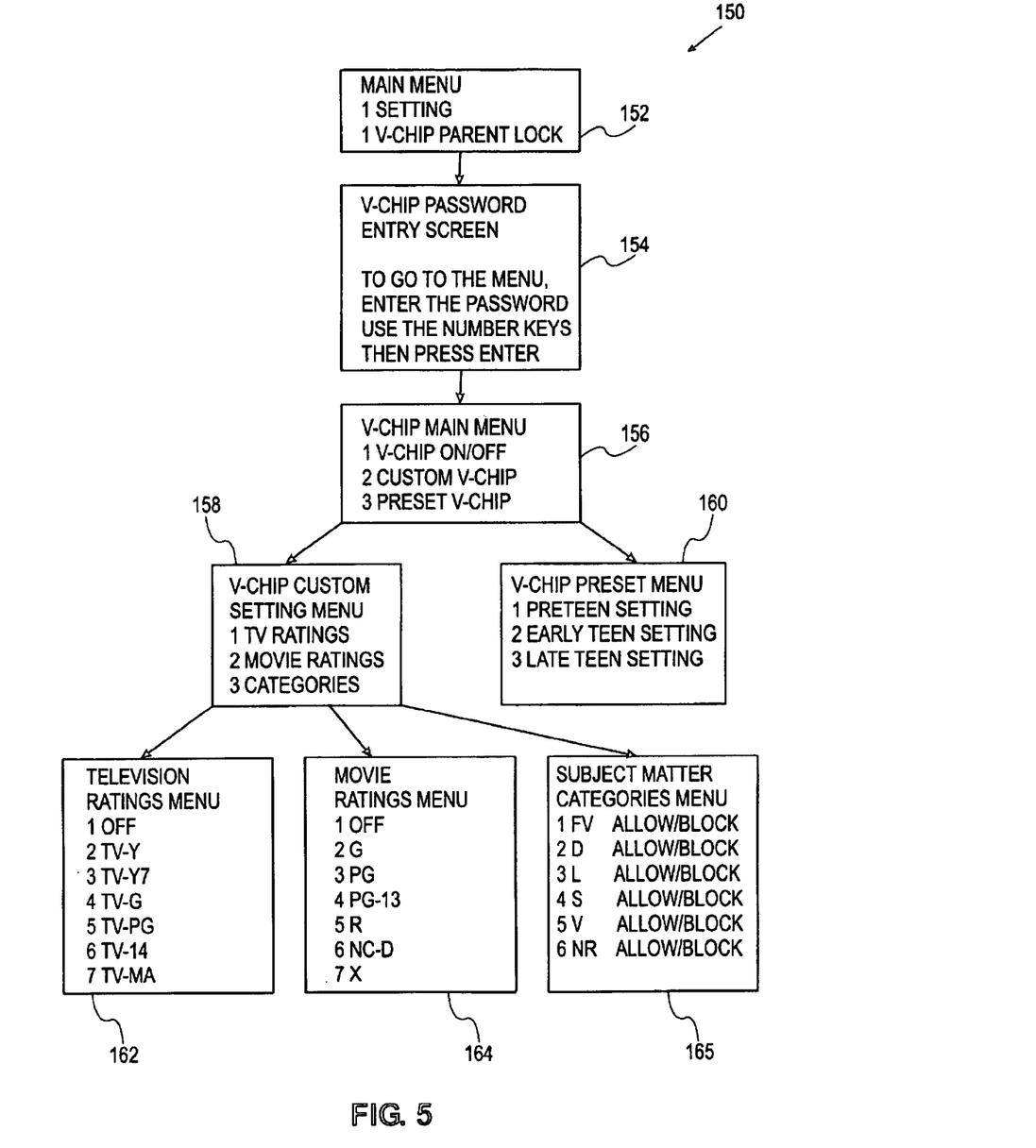
FIG. 5 is a menu system that allows a user to program the "V-chip" system of FIG. 3 with custom or preset content-based specifications.

Programming of the current content-based specification $C_{CUR}$ into the "V-chip" circuitry 102, and particularly the nonvolatile memory 122, is preferably effected through the use of a menu system 150, which appears on the television screen 110. As depicted in FIG. 5, the menu system 150 includes an array of menus, which includes a main menu 152, a "V-chip" passcode entry screen 154, a "V-chip" main menu 156, a "V-Chip" custom setting menu 158, a "V-Chip" preset menu 160, a television ratings menu 162, a movie ratings menu 164, and a subject matter categories menu 165.

Figure 6:
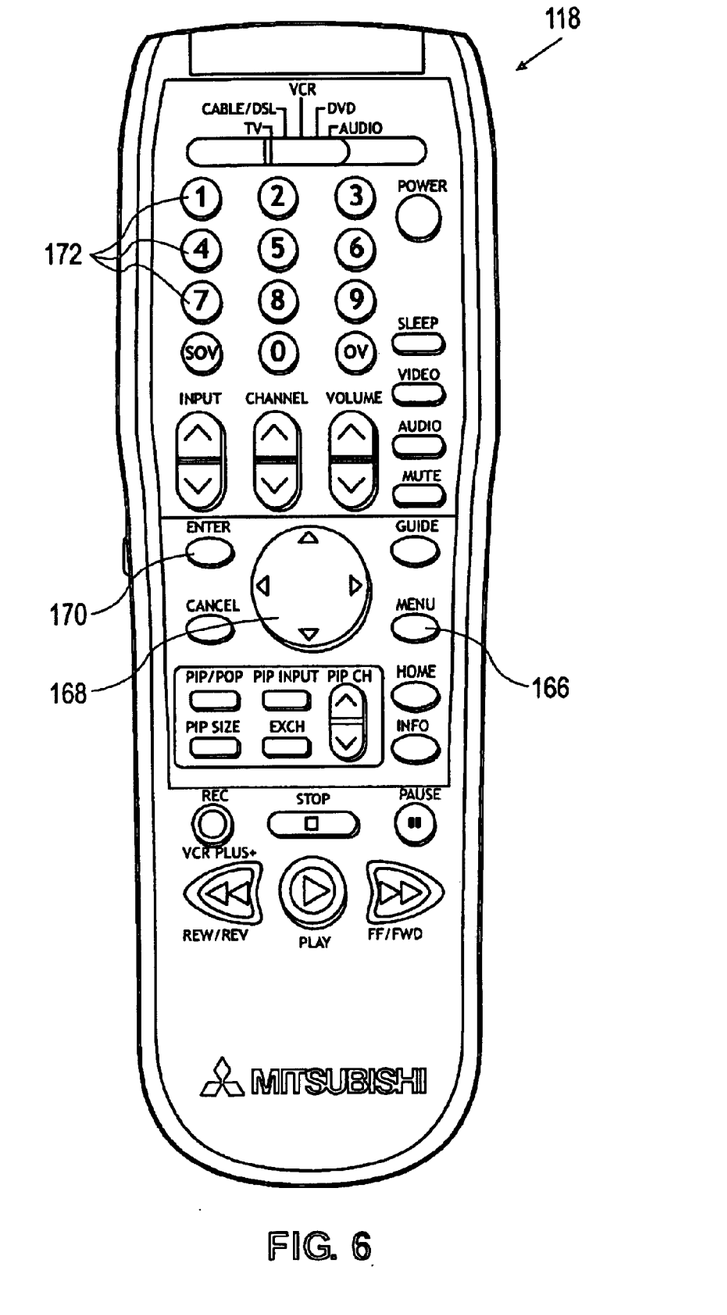
FIG. 6 is a detailed depiction of a remote control unit used in conjunction with the menu system of FIG. 5 to program the custom or preset content-based specifications.

The user entry system 116, and particularly the remote control unit 118 (shown in detail in FIG. 6), is the operative device through which the user can interact with the menu system 150. The remote control unit 118 includes a menu key 166, adjust thumb disc 168, enter key 170 and numeric keys 172 to allow the user to input selected information via the menu system 150. Depression of the menu key 166 displays the main menu 152 when the television system 100 is in a home state (i.e., normal operation of the television system 100). If the main menu 152 is displayed, subsequent depression of the menu key 166 returns the user back to the home state. If one of the submenus is displayed, depression of the menu key 166 displays the previous menu. The adjust thumb disc 168 allows the user to scroll up, down, left or right within the menu system 150 to select a particular menu item. Depression of the enter key 170 allows the user to enter a selected menu item into the nonvolatile memory 122.

Within the main menu 152, the user can select the SETTINGS menu item, which takes the user to television settings menu (not shown), allowing the user to customize audio, video and other standard features. The user can also select the V-CHIP PARENT LOCK menu item, which takes the user to the "V-chip" passcode entry screen 154. A passcode, preferably known only by the parents, is entered via the numeric keys 172. If the correct passcode is entered, the user in this case, the parent) is taken to the "V-chip" main menu 156. If an incorrect passcode is entered, the user is not taken to the "V-chip" main menu 156, and the words "try again" are displayed.

In the "V-chip" main menu 156, the user can then select V-CHIP ON or V-CHIP OFF to alternately enable and disable the "V-chip" circuitry 102. The "V-chip" main menu 156 can also be used to customize a "V-Chip" setting. Selection of the CUSTOM V-CHIP within the "V-Chip" main menu 156 takes the user to the "V-Chip" custom setting menu 158, allowing the user to build the custom content-based specification $C_{CUST}$ described briefly above. In this regard, the user can individually select ratings (television and/or movie) and subject matter categories, to create the customized content-based specification set $C_{CUST}$, which is input into the nonvolatile memory 122 as the current content-based specification set $C_{CUR}$. Specifically, the user can select TV RATINGS, MOVIE RATINGS, or CATEGORIES within the "V-Chip" custom setting menu 158, to take the user respectively to the television ratings menu 162, movie ratings menu 164, or subject matter categories menu 165.

Within the television ratings menu 162, the user can select a particular television rating, which prevents any program P exceeding the selected television rating from being output by the main television unit 108. Of course, selection of a particular television rating can, alternatively, block any program P having or exceeding the selected television rating from being output by the main television unit 108. The television ratings can be selected from the following: OFF, TV-Y, TV-Y7, TV-G, TV-PG, TV-14 and TV-MA. A selection of OFF directs the logic unit 126 to remove the previous television rating from the current content-based specification set $C_{CUR}$ stored in the nonvolatile memory 122, such that the current content-based specification set $C_{CUR}$ has no television rating. In this case, the program signal $S_p$ is not analyzed for content with respect to television ratings. A selection of one of the television ratings, on the other hand, directs the logic unit 126 to replace any previous television rating of the current content-based specification set $C_{CUR}$ with the next highest or mature television rating from the selected television rating, if the current content-based specification set $C_{CUR}$ represents the lowest objectionable rating of the program signal $S_p$. Alternatively, if the current content-based specification set $C_{CUR}$ represents the highest allowable rating of the program signal $S_p$, the logic unit 126 is directed to replace any previous television rating of the current content-based specification set $C_{CUR}$ with the selected television rating.

Thus, programs P that are rated above the selected television rating cannot be viewed. For example, if the user wishes to block all programs P that are rated above TV-14, the user may select the television rating to be TV-14. Of course, selection of a particular television rating can, alternatively, block any program P having or exceeding the selected television rating from being output by the main television unit 108. In this case, if the user wishes to block all programs P that are rated above TV-14 TV-MA. It should be noted that, since a selection of a particular television rating is effectively also a selection of all television ratings below the selected television rating, a selection of TV-MA is effectively the same as selecting OFF. As described above, however, selection of TV-MA affects the selection of the subject matter categories.

Within the movie ratings menu 164, the user can select a particular movie rating, which prevents any program P exceeding the selected movie rating from being output by the main television unit 108. The movie ratings can be selected from the following: OFF, G, PG, PG-13, R, NC-17 and X. A selection of OFF directs the logic unit 126 to remove the previous movie rating from the current content-based specification set $C_{CUR}$ stored in the nonvolatile memory 122, such that the current content-based specification set $C_{CUR}$ has no movie rating. In this case, the program signal $S_p$ is not analyzed for content with respect to movie ratings. A selection of one of the movie ratings, on the other hand, directs the logic unit to replace any movie rating in the content-based specification set $C_{CUR}$ with the next highest or mature movie rating from the selected television rating, if the current content-based specification set $C_{CUR}$ represents the lowest objectionable rating of the program signal $S_p$. Alternatively, if the current content-based specification set $C_{CUR}$ represents the highest allowable rating of the program signal $S_p$, the logic unit 126 is directed to replace any previous movie rating of the current content-based specification set $C_{CUR}$ with the selected movie rating.

Thus, programs P that are rated above the selected movie rating cannot be viewed. For example, if the user wishes to block all programs P that are rated above PG-13, the user may select the movie rating to be PG-13. Of course, selection of a particular movie rating can, alternatively, block any program P having or exceeding the selected movie rating from being output by the main television unit 108. In this case, if the user wishes to block all programs P that are rated above PG-13, the user may select the movie rating to be R. It should be noted that selection of X is effectively the same as selecting OFF.

Within the subject matter categories menu 165, the user can either select to allow a program P to be output by the main television unit 108, or prevent the program P from being output by the main television unit 108, when the program P contains subject matter falling within the selected subject matter category. The subject matter categories can be selected from the following: FV (Fantasy Violence), D (Sexual Dialog), L (Adult Language), S (Sexual Situations), V (Violence) and Non-Rated Programs. If the current content-based specification set $C_{CUR}$ represents objectionable subject matter of the program signal $S_p$, a selection to allow a particular subject matter category directs the logic unit 126 to remove the selected subject matter category from the current content-based specification set $C_{CUR}$ stored in the nonvolatile memory 122. Conversely, a selection to block a particular subject matter category directs the logic unit 126 to store the selected subject matter category in the current content-based specification set $C_{CUR}$. Alternatively, if the current content-based specification set $C_{CUR}$ represents allowable subject matter of the program signal $S_p$, a selection to allow a particular subject matter category directs the logic unit 126 to store the selected subject matter category in the current content-based specification set $C_{CUR}$. Conversely, a selection to block a particular subject matter category directs the logic unit 126 to remove the selected subject matter category from the current content-based specification set $C_{CUR}$ stored in the nonvolatile memory 122.

Thus, if the user wishes to block all programs P that contain sexual situations and sexual dialog, the user may select the allowed subject matter categories to be L (Adult Language) and V (Violence) and the blocked subject matter categories to be S (Sexual Situations) and D (Sexual Dialog). Since some programs P, such as news and sports, are not rated or are un-rated, a subject matter category NR is provided, so that the user can select to either allow or block all non-rated programs P. It should be noted that, if the television rating is OFF, the non-rated programs P cannot be blocked.

Thus, by individually selecting the television rating (such as TV-14), movie rating (such as PG-13) and the subject matter categories (such as blocking categories S and D), a customized content-based specification set $C_{CUST}$, which effects blocking of all programs P that are rated higher than TV-14 or PG-13, and all programs P that contain sexual situations and sexual dialog, can be generated.

Optionally, the "V-chip" main menu 156 can be used to select from a multitude of preset "V-Chip" settings, providing the user with quick and easy access to the "V-Chip" functionality. Selection of the PRESET V-CHIP menu item within the "V-Chip" main menu 156 takes the user to the "V-Chip" preset menu 160, allowing the user to select from one or more preset content-based specification sets $C_{PRESET}$, which have been previously stored in the permanent nonvolatile memory 124 by the manufacturer. Specifically, the user can select from three menu items, aptly called PRETEEN SETTING, EARLYTEEN SETTING and LATETEEN SETTING, which correspond to respective first, second and third preset content-based specification sets $C_{PRESET1}$, $C_{PRESET2}$, and $C_{PRESET3}$, stored in the permanent nonvolatile memory 124. Selection of any of the menu items PRETEEN SETTING, EARLYTEEN SETTING and LATETEEN SETTING automatically stores the corresponding preset content-based specification set $C_{PRESET}$ in the nonvolatile memory 122 as the current content-based specification set $C_{CUR}$.

Selection of the PRETEEN SETTING directs the logic unit 126 to select the first preset content-based specification set $C_{PRESET1}$ stored in the permanent nonvolatile memory 124, as the current content-based specification set $C_{CUR}$. By way of non-limiting example, the PRETEEN SETTING can allow viewing of a program P only if that program P has a television rating of TV-Y7 or lower, a movie rating of G or lower, and contains no subject matter other than fantasy violence. Accordingly, the first preset content-based specification $C_{PRESET1}$ stored in the permanent nonvolatile memory 124 will specify TV-PG, PG, and (D, L, S, V). Thus, selection of the PRETEEN SETTING blocks all programs P rated above TV-Y7 or G, and blocks all programs P containing sexual dialog, adult language, sexual situations and violence.

Selection of the EARLYTEEN SETTING directs the logic unit 126 to select the second preset content-based specification set $C_{PRESET2}$ stored in the permanent nonvolatile memory 124, as the current content-based specification set $C_{CUR}$. By way of nonlimiting example, the EARLYTEEN SETTING can allow viewing of a program P only if that program P has a television rating of TV-PG or lower, a movie rating of PG or lower, and contains no subject matter other than fantasy violence, violence or adult language. Accordingly, the second preset content-based specification $C_{PRESET2}$ stored in the permanent nonvolatile memory 124 will specify TV-14, PG-13, and (L, S). Thus, selection of the EARLYTEEN SETTING blocks all programs P rated above TV-PG or PG and blocks all programs P containing sexual dialog and sexual situations.

Selection of the LATETEEN SETTING directs the logic unit 126 to select the third preset content-based specification set $C_{PRESET3}$ stored in the permanent nonvolatile memory 124, as the current content-based specification set $C_{CUR}$. By way of nonlimiting example, the LATETEEN SETTING can allow viewing of a program P only if that program P has a television rating of TV-MA or lower, a movie rating of R or lower, and contains any subject matter. Accordingly, the third preset content-based specification $C_{PRESET3}$ stored in the permanent nonvolatile memory 124 will specify no television rating, a movie rating of NC-17, and no subject matter categories. Thus, selection of the LATETEEN SETTING blocks all programs P rated above NC-17.

Thus, a user can then simply select one of the three settings (either PRETEEN SETTING, EARLYTEEN SETTING, or LATETEEN SETTING) to select the appropriate preset content-based specification set $C_{PRESET}$ in the permanent non-volatile memory 124, based on the profile of the user's family. In this manner, the generation of the current content-based specification set $C_{CUR}$ is made simple. Alternatively, only a single preset content-based specification set $C_{PRESET}$ is stored in the permanent non-volatile memory 124, in which case the user need only select the PRESET V-CHIP within the "V-Chip" main menu 156 to select the single preset content-based specification set $C_{PRESET}$. Thus, the generation of the current content-based specification set $C_{CUR}$ is made even more simple.

Figure 7:
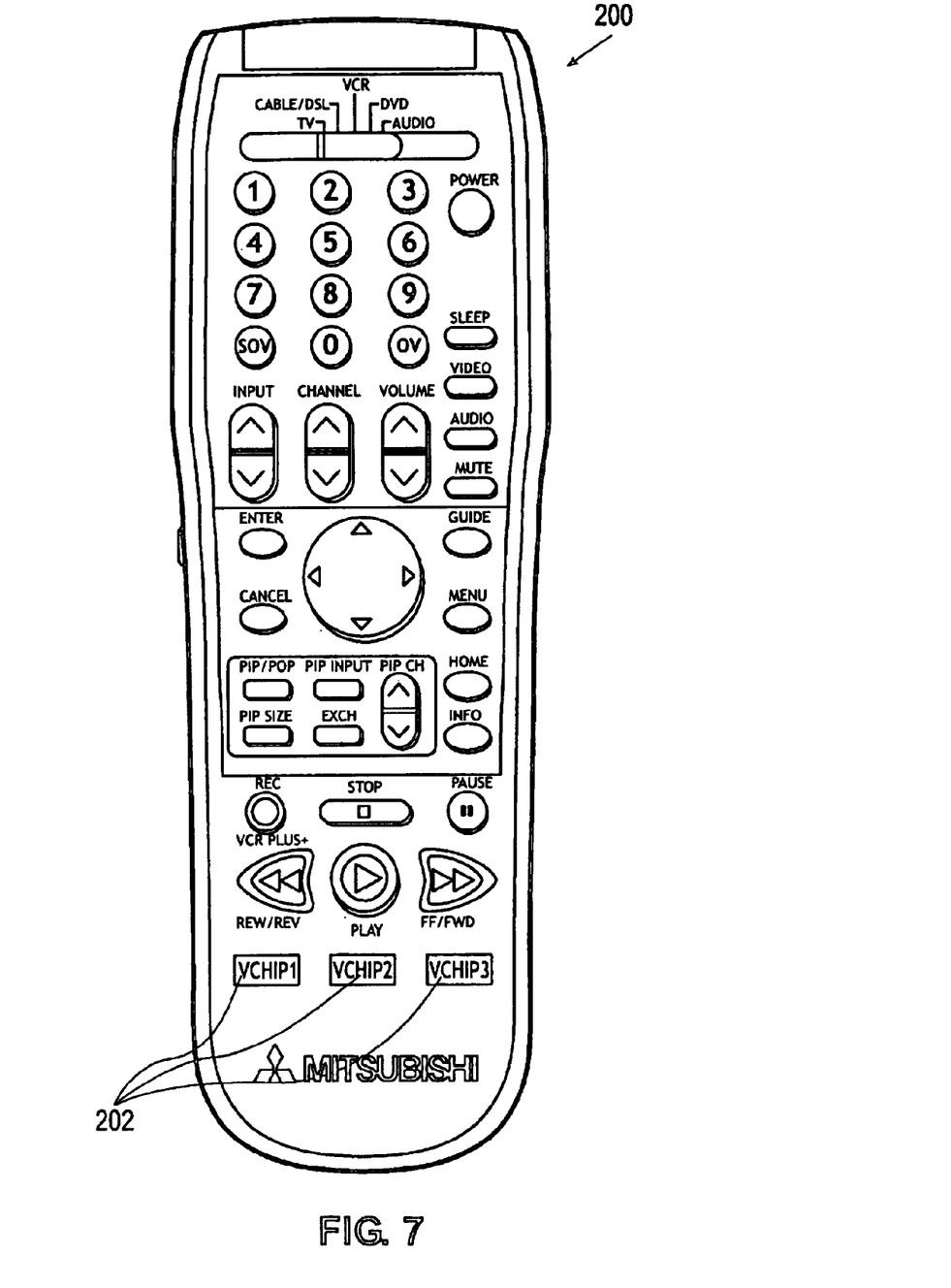
FIG. 7 is a detailed depiction of another remote unit that can be used to program preset content-based specifications separately from the menu system of FIG. 5.

Alternative to the menu system 150, selection of the preset content-based specification sets $C_{PRESET}$ can be accomplished using dedicated function keys on the remote control unit of the television system 100, or even on the main unit on the television system 100. For example, FIG. 7 depicts a remote control unit 200, much like the remote control unit 118 depicted in FIG. 6, with the exception that the remote control unit 200 includes dedicated "V-Chip" keys 202, labeled VCHIP1, VCHIP2 and VCHIP3. The VCHIP1, VCHIP2 and VCHIP3 keys correspond to the first, second and third preset content-based specification sets $C_{PRESET}$ stored in the permanent nonvolatile memory 124. Of course, if only a single preset content-based specification set $C_{PRESET}$ is stored in the permanent nonvolatile memory 124, a single "V-Chip" key 202 is located on the remote unit 200.

If one of the "V-Chip" keys 202 is depressed, a passcode menu screen, much like the "V-Chip" passcode entry screen 154 shown in FIG. 5, appears on the television screen 110. The valid passcode must be entered to enable V-Chip review of programming. The first time one of the "V-Chip" keys 202 is depressed, a new passcode will be requested unless the passcode has already been entered from the menu system 150. If a new passcode is entered, the "V-Chip" circuitry 102 is immediately enabled and no further message is displayed. After the initial passcode is displayed, that passcode must be entered to alternately enable or disable the "V-Chip" circuitry 102. That is, if the "V-Chip" circuitry 102 is currently enabled, a subsequent depression of one of the "V-Chip" keys 202 requests a passcode to disable the "V-Chip" circuitry 102, and if the "V-Chip" circuitry 102 is currently disabled, a subsequent depression of one of the "V-Chip" keys 202 requests a passcode to enable the "V-Chip" circuitry 102. Enablement of the "V-Chip" circuitry 102 using one of the "V-Chip" keys 202, automatically completes selection of the preset content-based specification set $C_{RESET}$ corresponding to the depressed "V-Chip" key 202, storing the selected preset content-based specification set $C_{PRESET}$ in the nonvolatile memory 122 as the current content-based specification set $C_{CUR}$.

Rather than using a passcode system, a user recognition device, such as an imaging system, can be employed in conjunction with the remote unit 200 to identify a particular feature of the user, such as a fingerprint. Further details concerning methods for inputting user-specific information into a consumer electronics system is disclosed in copending application Ser. No. 08/775,093, filed Dec. 30, 1996, which is hereby fully and expressly incorporated herein by reference.

Once the "V-Chip" circuitry is enabled, either through the menu system 150 or the dedicated "V-Chip" keys 202, and once the current content-based specification set CCUR is generated, via either the custom content/based specification set CCUST or selection of one of the preset content-based specification set CPRESET, the "V-Chip" circuitry 102 will analyze the content of the program P against the criteria set by the user. If the content of the program P transgresses the set criteria (i.e., the current content/based specification set CCUR), the television screen 110 will be blanked and a password screen will be displayed. If a valid passcode is entered, or if the television channel is changed, such that the content of a different program P does not transgress the set criteria, the program P will be displayed on the television screen 110. While preferred methods and embodiments have been shown and described, it will be apparent to one of ordinary skill in the art that numerous alterations may be made without departing from the spirit or scope of the invention. Therefore, the invention is not to be limited except in accordance with the following claims.

What is claimed is:

1. A method of supervising personal exposure to a consumer electronics device by a user, the method comprising:

selecting one of one or more viewer profile specification sets stored in permanent memory within the consumer electronics device in response to a user input;

setting a content-based specification set automatically in response to the selection of one of the one or more viewer profile specification sets, each of the content-based specification comprising a rating and a subject matter category;

receiving a program signal suitable for conversion by the consumer electronics device into user discernible information;

receiving a content-based indicator set indicative of a rating and a subject matter category of the program signal;

comparing the content-based specification set with the received content-based indicator set; and impairing the program signal based on the comparison.

2. The method of claim 1, wherein the received content-based indicator set is carried by the program signal.

3. The method of claim 1, wherein the program signal is impaired if the received content-based indicator set transgresses the selected content-based specification set.

4. The method of claim 1, wherein the rating of the respective content-based specification and content-based indicator sets is a television rating.

5. The method of claim 1, wherein the rating of the respective content-based specification and content-based indicator sets is a movie rating.

6. The method of claim 1, wherein the subject matter category of the respective content-based specification and content-based indicator sets is one of FV (Fantasy Violence), D (Sexual Dialog), L (Adult Language), S (Sexual Situations) and V (Violence).

7. The method of claim 1, wherein the viewer profile specification set is selected via a menu.

8. The method of claim 1, wherein the viewer profile specification set is selected via a dedicated function key.

9. The method of claim 1, wherein selection of the viewer profile specification set is effected in response to entry of a valid passcode.

10. The method of claim 1, wherein selection of the viewer profile specification set is effected in response to entry of valid user information.

11. Permanent recordable media for a consumer electronics device, comprising:

one or more viewer profile specification sets, each of the one or more viewer profile specification sets being selectable by a user;

at least one content-based specification set corresponding to the one or more viewer profile specification sets, the content-based specification set comprising a rating and a subject matter category; and a computer program comprising the steps:

selecting one of the one or more viewer profile specification sets upon command by a user of the consumer electronics device;

setting the corresponding content-based specification set automatically in response to the selection of one of the one or more viewer profile specification sets;

comparing the corresponding content-based specification set with a content-based indicator set received by the consumer electronics device, the received content-based indicator set indicating a rating and a subject matter category of a program signal received by the consumer electronics device; and generating a control signal in response to the comparison between the corresponding content-based specification set and the received content-based indicator set.

12. The permanent recordable media of claim 11, wherein a blocking control signal is generated if the received content-based indicator set transgresses the corresponding content-based specification set, and wherein generation of the control signal impairs a program signal received by the consumer electronics device.

13. The permanent recordable media of claim 11, wherein the rating of the respective content-based specification and content-based indicator sets is a television rating.

14. The permanent recordable media of claim 11, wherein the rating of the respective content-based specification and content-based indicator sets is a movie rating.

15. The permanent recordable media of claim 11, wherein the subject matter category of the respective content-based specification and content-based indicator sets is one of FV (Fantasy Violence), D (Sexual Dialog), L (Adult Language), S (Sexual Situations) and V (Violence).

16. A consumer electronics device having "V-chip" circuitry for supervising personal exposure to user discernible information, comprising:

permanent nonvolatile memory comprising:
one or more viewer profile specification sets, each of the viewer profile specification sets being selectable by a user; and
at least one content-based specification set corresponding to the one or more viewer profile specification sets, the content-based specification set comprising a rating and a subject matter category;

a logic unit coupled to the nonvolatile memory and being configured for:
setting the corresponding content-based specification set automatically in response to the selection of the viewer profile specification set by a user of the consumer electronics device;
comparing the corresponding content-based specification set with a content-based indicator set received by the consumer electronics device, the received content-based indicator set indicating a rating and a subject matter category of a program signal received by the consumer electronics device; and
generating a control signal based on the comparison between the corresponding content-based specification set and the content-based indicator set; and a program signal impairment mechanism coupled to the logic unit and configured for, based on the control signal, selectively passing a program signal without substantial impairment or impairing the program signal.

17. The consumer electronics device of claim 16, further comprising an output device coupled to the program signal impairment mechanism for transforming the program signal into the user discernible information.

18. The consumer electronics device of claim 16, further comprising a data entry system for commanding the logic unit to set a custom content-based specification set.

19. The consumer electronics device of claim 16, wherein the program signal carries the content-based indicator set, and further comprising a data extraction device coupled to the logic unit for extracting the content-based indicator set from the program signal.

20. The consumer electronics device of claim 16, wherein the program signal impairment device is a switch.

21. The consumer electronics device of claim 16, wherein the program signal impairment device is a scrambler.

22. The consumer electronics device of claim 16, wherein the output device is a television system audio/video output device.

23. The consumer electronics device of claim 16, wherein the permanent nonvolatile memory is ROM.

24. The consumer electronics device of claim 16, wherein the logic unit is a microcomputer.

25. A method of supervising personal exposure to a consumer electronics device by a user, the method comprising:

accessing a V-chip menu system stored in permanent memory within the consumer electronic device, the menu system including a menu comprising a first selection for accessing a preset criteria menu and a second selection for accessing a custom criteria menu, wherein the preset criteria menu includes one or more viewer profile specification sets stored in permanent memory, each of the viewer profile specification sets being selectable and having a corresponding content-based specification set comprising a rating and a subject matter category, and wherein the custom criteria menu includes a plurality of selections corresponding to ratings and subject matter categories individually stored in permanent memory;

selecting the first selection and accessing the preset criteria menu;

selecting a first viewer profile specification set;

automatically setting the corresponding content-based specification set in response to the selection of the viewer profile specification set; and storing the corresponding content-based specification set in memory as a current content-based specification set.

26. The method of claim 25 further comprising the steps of:

receiving a program signal suitable for conversion by the consumer electronics device into user discernible information;

receiving a content-based indicator set indicative of a rating and a subject matter category of the program signal;

comparing the current content-based specification set with the received content-based indicator set; and impairing the program signal based on the comparison.

27. The method of claim 25, wherein the received content-based indicator set is carried by the program signal.

28. The method of claim 25, wherein the program signal is impaired if the received content-based indicator set transgresses the current content-based specification set.

29. The method of claim 25, wherein the rating of the respective content-based specification and content-based indicator sets is a television rating.

30. The method of claim 25, wherein the rating of the respective content-based specification and content-based indicator sets is a movie rating.

31. The method of claim 25, wherein the subject matter category of the respective content-based specification and content-based indicator sets is one of FV (Fantasy Violence), D (Sexual Dialog), L (Adult Language), S (Sexual Situations) and V (Violence).

32. The method of claim 25, wherein the viewer profile specification set is selected via a dedicated function key.

33. The method of claim 25, wherein selection of the viewer profile specification set is effected in response to entry of a valid passcode.

34. The method of claim 25, wherein selection of the viewer profile specification set is effected in response to entry of valid user information.

35. The method of claim 16, wherein each viewer profile specification set is labeled with an age group.

36. The method of claim 16, wherein the viewer profile specification set is immediately selectable upon the initial operation of the consumer electronics device.

37. The method of claim 36, wherein at least one content-based specification set comprises a television rating and a movie rating.

38. The method of claim 37, wherein at least one content-based specification set includes a plurality of standardized ratings.

39. The method of claim 1, wherein each viewer profile specification set has a separate corresponding content-based indicator set.

40. The method of claim 1, wherein each content-based indicator set comprises a movie rating, a television rating and a subject matter category that is one of FV (Fantasy Violence), D (Sexual Dialog), L (Adult Language), S (Sexual Situations) and V (Violence).

41. The permanent recordable media of claim 11, further comprising a separate content-based indicator set corresponding to each viewer profile specification set.

42. The permanent recordable media of claim 11, wherein each content-based indicator set comprises movie rating, a television rating and a subject matter category that is one of FV (Fantasy Violence), D (Sexual Dialog), L (Adult Language), S (Sexual Situations) and V (Violence).

43. The consumer electronics device of claim 16, further comprising a separate content-based indicator set corresponding to each viewer profile specification set.

44. The consumer electronics device of claim 16, wherein each content-based indicator set comprises a movie rating, a television rating and a subject matter category that is one of FV (Fantasy Violence), D (Sexual Dialog), L (Adult Language), S (Sexual Situations) and V (Violence).

45. The method of claim 25, wherein each viewer profile specification set has a corresponding separate content-based indicator set.

46. The method of claim 25, wherein each content-based indicator set comprises a movie rating, a television rating and a subject matter category that is one of FV (Fantasy Violence), D (Sexual Dialog), L (Adult Language), S (Sexual Situations) and V (Violence).

* * * * *